United States Patent Office 3,813,319
Patented May 28, 1974

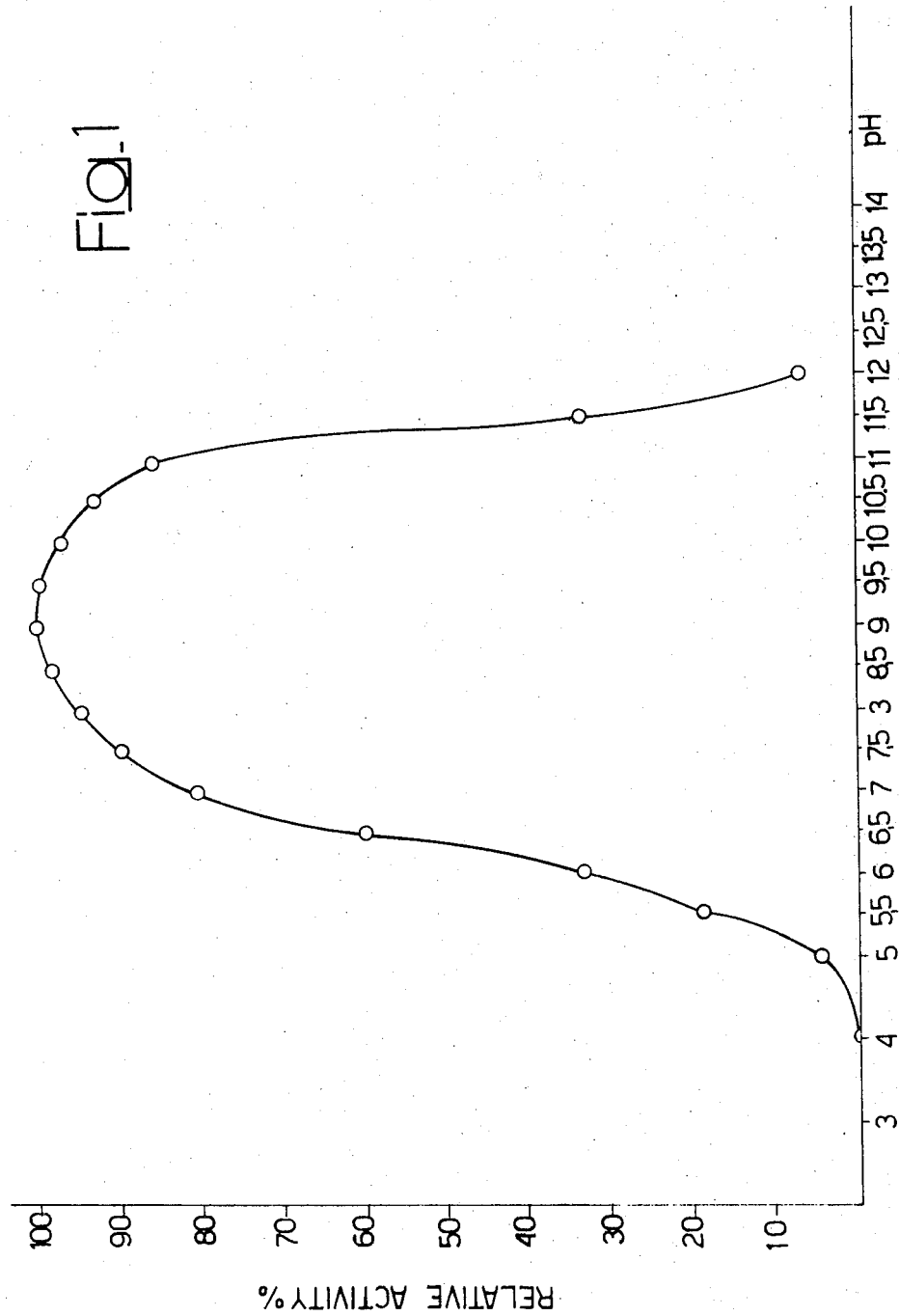

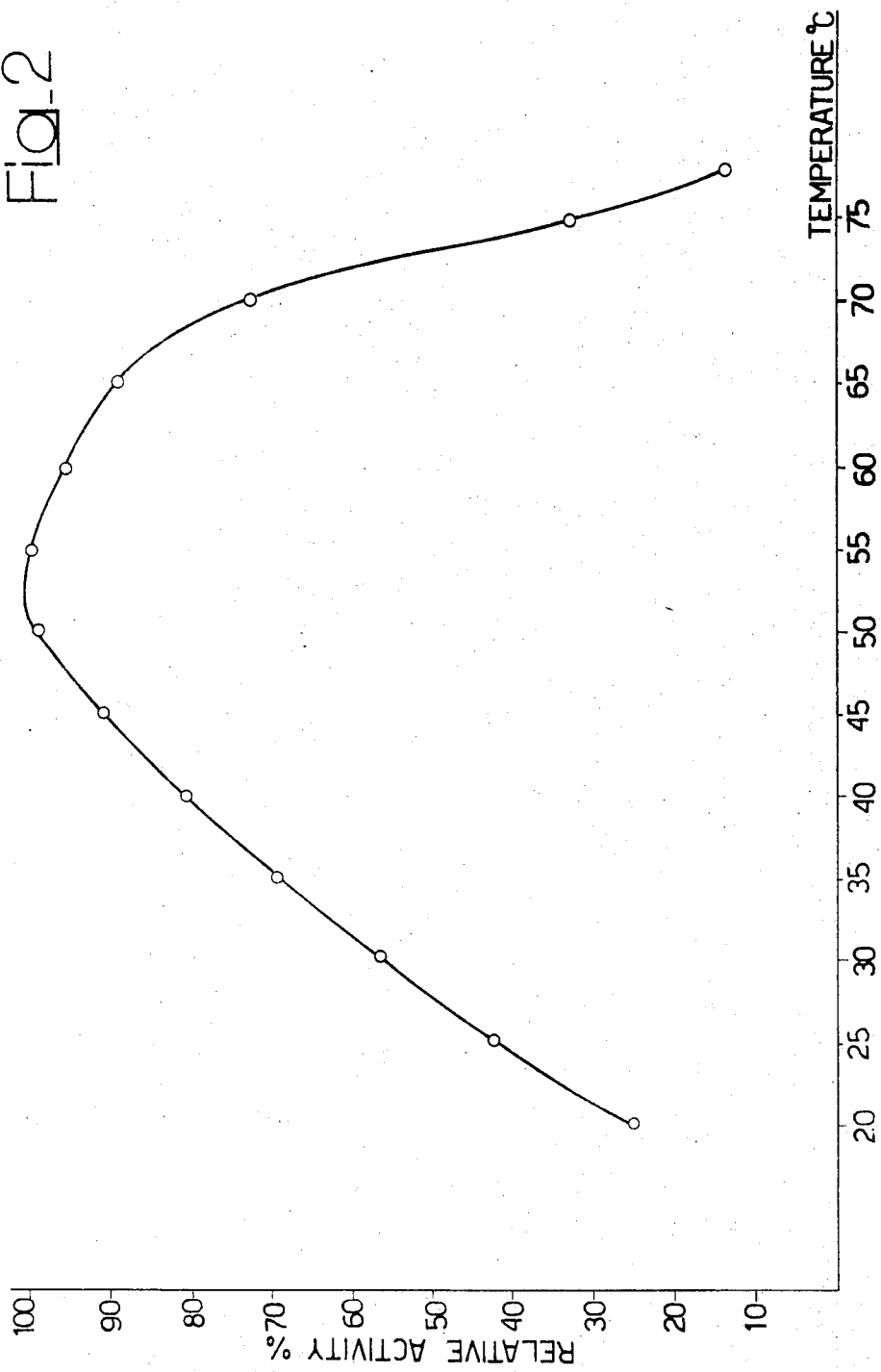

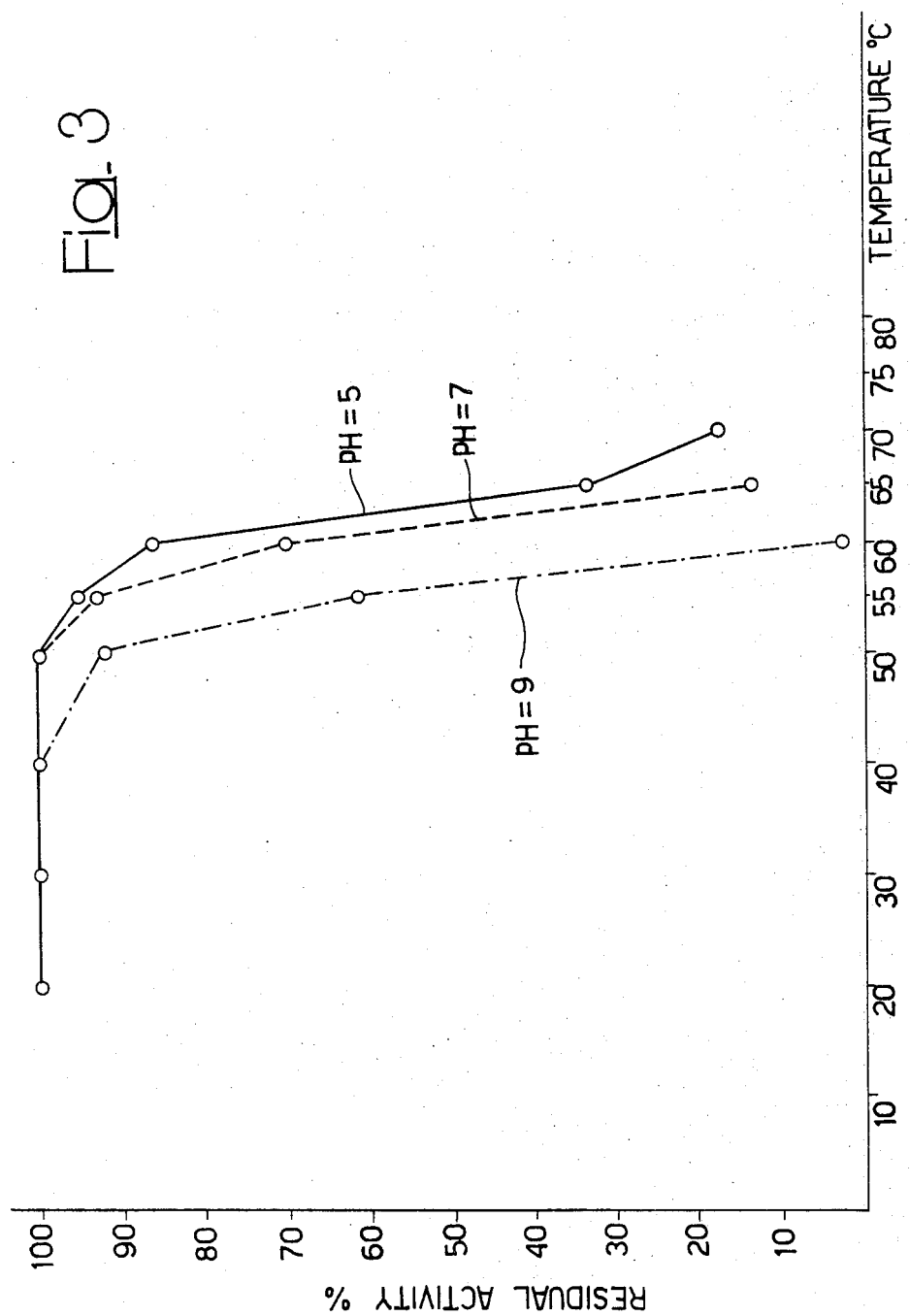

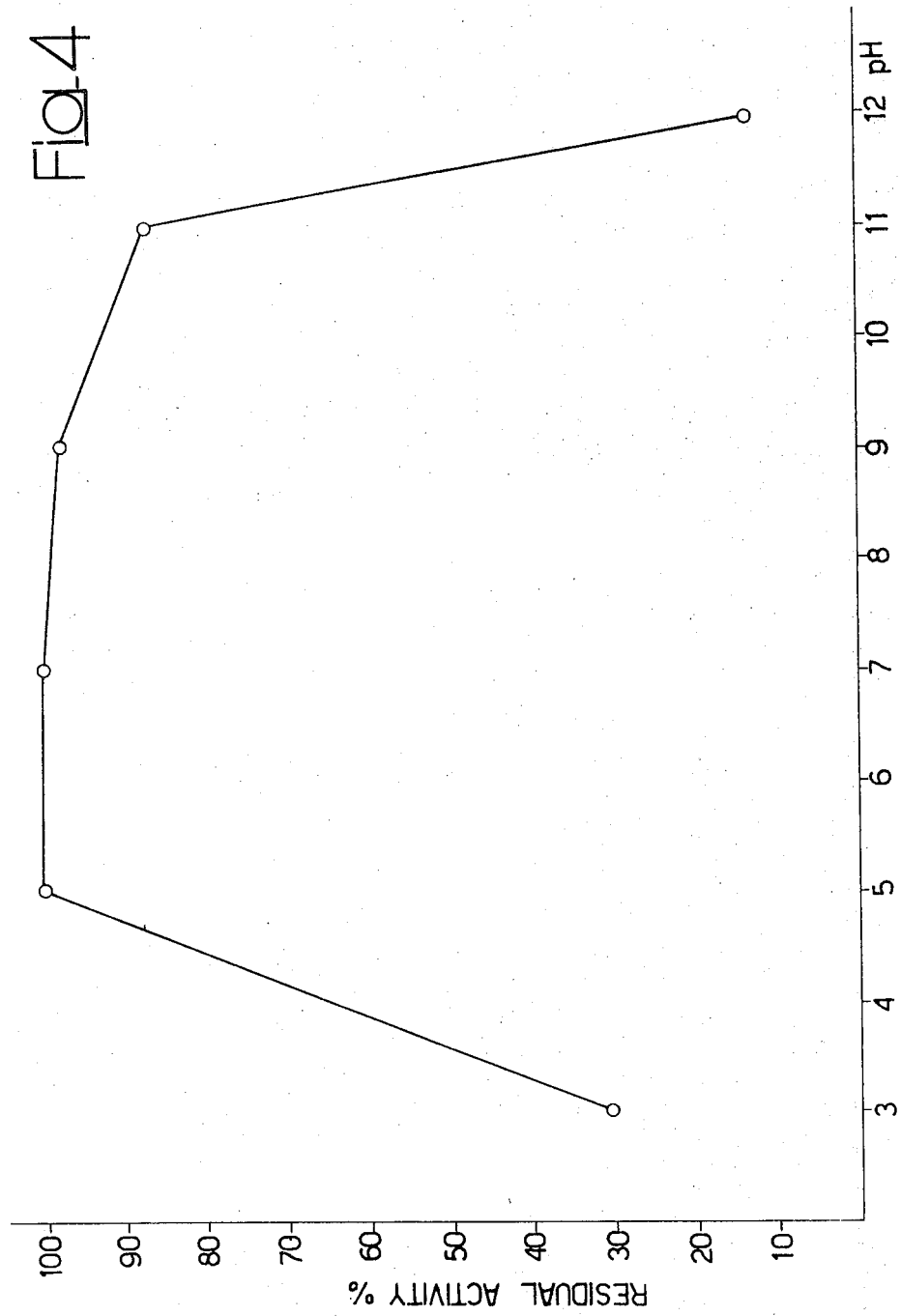

---

3,813,319
PROCESS FOR THE MANUFACTURE OF PROTEASES
Renato Craveri, Milan, Pier Luigi Manachini, Cologno Monzese, and Fabrizio Aragozzini, Milan, Italy, assignors to Societá Italiana Resine S.I.R. S.p.A., Milan, Italy
Filed Mar. 15, 1972, Ser. No. 234,742
Claims priority, application Italy, Mar. 23, 1971, 22,113/71
Int. Cl. C12d *13/10*
U.S. Cl. 195—65         6 Claims

ABSTRACT OF THE DISCLOSURE

A process for the manufacture of proteases of high proteolytic activity, having optimum activity at a pH ranging from 7 to 11 and at a temperature of from 45° to 65° C. and exhibiting a stability of at least 1 hour at 40° C. and at a pH of from 5 to 10, which comprises culturing the micro-organism designated as ATCC No. 20350 belonging to the thermophilic eumycetes group in cultural media comprising at least one source of carbon, at least one source of nitrogen, and at least one mineral salt in the presence of a quantity of air ranging from 0.2 to 1 liter/liter/minute, under agitation, for a time ranging from 30 to 70 hours, at a temperature of 38° to 45° C. and at a pH value of from 6.5 to 8, is disclosed.

BACKGROUND OF THE INVENTION

1. Field of the invention

The present invention relates to a process for the manufacture of proteases by cultivation of micro-organisms.

In particular, the present invention relates to a process for the manufacture of proteases of high proteolytic activity, having optimum activity at a pH of from 7 to 11 and at a temperature of from 45° to 65° C., and with a stability of at least 1 hour at 40° C. and at a pH between 5 and 10.

Such proteases are industrially very useful, particularly for the formulation of detergent compositions and preparations for alimentary or pharmaceutical use.

SUMMARY OF THE INVENTION

We have found that such products can be obtained by cultivation, under controlled aerobic conditions in culture media based on flour, sugars and various mineral salts, of a micro-organism belonging to the thermophilic eumycetes group.

More particularly, the strain concerned is that which is deposited with the collection of the Vegetable Pathology Institute of the University of Studies in Milan under No. I.P.V. F–434 and the American Type Culture Collection (ATCC) under ATCC No. 20350.

This strain was isolated from a sample of soil taken from the province of Pavia, Italy, and, after transplanting, maintained on agar malt or potato agar-glucose-yeast extract.

The morphological, cultural and physiological properties of the strain are indicated below:

*Colonies*: On agarized soil, after 4 to 6 days' incubation at 40° to 43° C., the colonies of the stock were cotton-like, expanded, like cobwebs, consisting of a vegetative mycelium of creamy-white color, and a whitish aerial mycelium.

*Morphology*: The mycelium consists of septate hyphae varying in diameter from 2 to 12 microns, branched, in arrangement which can give rise to coiled, aggregated, globus formations in which or on which no typically conidial or sexual phases were observed. Reproduction commonly occurs by fragments or conglomerates of hyphae, so that the strain is provisionally classified among the "mycelia sterilia."

*Degree of Growth*: On agarized cultural media, after 6 days incubation at 43° C.:

| Medium: | Growth |
|---|---|
| Malt | Good |
| Milk | Good |
| Potato-glucose-yeast extract | Good |
| Glucose-yeast extract | Moderate |
| Starch-yeast extract | Good |
| Common (ordinary) | Poor |
| Common-yeast extract | Poor |
| Common-glucosate | Good |
| Soya | Good |
| Oats | Good |
| Rice infusion | Good |
| Manure infusion | Poor |
| Asparagine-glycerine | Moderate |
| Czapek's | Very poor |

*Requirements of temperature for development*: Minimum approximately 28° C., optimum approximately 43° C., maximum approximately 55° C.

*Oxygen requirement*: Aerobic.

*Requirement with respect to pH*: Good growth at a pH of from 5.5 to 8.

*Enzymatic activities*: Positive proteolytic, positive presamic, positive amylolytic, positive lipolytic, weak positive cellulosolytic.

*Use of carbon sources*: Positive for glucose, fructose, galactose, xylose, maltose, lactose, dextrin, starch, insulin, glycerine, mannitol; weak for saccharose.

*Use of nitrogen sources*: Positive for peptones, asparagine, urea, potassium nitrate, ammonium sulfate.

DETAILED DESCRIPTION OF THE INVENTION

For the production of proteases according to the present invention, an inoculum is first prepared.

For this purpose, the strain is sown in an appropriate liquid culture medium contained in a trough, prior to preparation of a suspension of mycelium obtained from slants.

As culture media, it is possible to use various cultural media prepared in the normal way for flour-based fermentation processes.

As sources of carbon, it is possible to use starch, dextrins, maltose, lactose or other carbohydrates in purified form or contained in flours such as, for example, maize, soya, groundnut, cotton, bran flours, or other products such as milk serum, oilcake or molasses.

As sources of nitrogen, it is possible to use those originating from the aforesaid flours or from other protein products or soluble peptones or sources of inorganic nitrogen.

Also various mineral salts such as phosphates, magnesium sulfate, zinc sulfate, etc., may be used.

The broth culture is used as inoculum for a fermenting vessel containing a cultural medium of a composition substantially the same as that of the trough or perhaps of a different composition, and subsequently this latter broth culture is used to inoculate various fermenting vessels.

Fermentation is carried out in the presence of air in quantities comprising between 0.2 to 1 liter/liter/minute, with agitation, for a period of time ranging from 30 to 70 hours and at a temperature of 38° to 45° C.

To the fermentation mixture may be added other additives already known to men skilled in the art, for example, antifoaming products.

This fermentation is carried out under controlled conditions, particularly with regard to the pH value, which, during processing, is maintained at a value ranging from 6.5 to 8.

The cultural broths obtained on completion of fermentation, after separation of the solid parts suspended therein, for example by centrifugal treatment or filtration, are subjected to the usual concentration and purification procedures provided for in processes of this type in order to obtain the end product.

Enzymatic concentration may easily be carried out by precipitation of the enzyme with salts such as ammonium sulfate, chlorides, or tannin, organic solvents such as acetone or ethanol.

The protease preparations thus obtained have the following properties:

*Optimum pH of activity:* 7 to 11, as illustrated in FIG. 1 attached.

*Optimum temperature of activity:* 45° to 65° C., as illustrated in FIG. 2 attached.

*Stability:* After 1 hour at 40° C. and at a pH 5 to 10, approximately 100% stability; after 15 minutes at 55° C. approximately 5% inactivation at pH 5, approximately 7% inactivation at pH 7, approximately 40% inactivation at pH 9, as illustrated in FIGS. 4 and 3.

*Type of enzymatic action mechanism:* Endopeptidasic.

*Probable chemical nature of the enzymatic active centers:* Sulfhydrylic group and serinic group.

*Solubility:* Greater solubility in alkaline water, insoluble in acetone, ethanol, methanol, ethyl ether.

Such proteases are very useful industrially, particularly for the formulation of detergent compositions.

For quantitative determination of proteolytic activity, the following procedure is adopted:

250 mg. of crude enzyme ground in a mortar are dissolved in a borate buffer solution exhibiting a pH of 9 in a 500 ml. calibrated flask. After 30 minutes' agitation at room temperature, it is brought up to volume. Any insoluble residue is removed by centrifugal treatment.

The enzymatic solution is then diluted at the rate of 1 to 10 parts by volume, still with a borate buffer, and 1 ml. of the said dilute solution is added to 4 ml. of a substrate consisting of 0.5% Hammersten casein in a borate buffer which has previously been brought to 50° C. in a bain-marie. The enzyme-substrate mixture is incubated at 50° C. and the enzymatic reaction is interrupted after 10 minutes by the addition of 5 ml. of a precipitating solution.

This precipitating solution is prepared by adding to a 1,000 ml. flask 16.35 g. of trichloroacetic acid, 16 g. of acetic acid and 40.8 g. of sodium acetate $3H_2O$, the volume being made up with distilled water. After 20 minutes, still at 50° C., the mixture is filtered through a Whatman No. 1 filter paper and the filtrate is centrifuged for 10 minutes at 3,000 r.p.m. if it is not clear.

The optical density (OD) of the filtrate (or product of centrifugal treatment) against a blank is determined at 275 millimicrons. The blank is prepared as above, except for the addition of the dilute enzymatic solution after the addition of the precipitating solution. For this purpose, 4 ml. of substrate, consisting of 0.5% Hammersten casein in a borate buffer at 50° C., have 5 ml. of precipitating solution added to them; after 10 minutes, 1 ml. of enzymatic solution is added and then the mixture is filtered after 20 minutes dwell, still at 50° C.

The optical density found is considered as being that of a quantity X of thyroxine in precipitating solution, read at 275 millimicrons.

For this purpose, it is necessary to plot a curve relative to values for OD of different concentrations of thyroxine (from 0.1 to 1 micromols of thyroxine per ml.).

The specific proteolytic activity of the product under examination is expressed in proteolytic units (PU) per gram of product and is given by the following equation:

$$PU/gr. = X.2.1,000$$

A PU is that quantity of enzyme which releases one micromol of thyroxine in 1 minute at 50° C. and at a pH of 9.

Quantitative determination of the proteolytic activity of fermentation broth cultures is carried out by applying the above-described method, subject to separation of the mycelium and any solid residues.

The present invention will now be illustrated in greater detail by the following example which is merely intended to be illustrative and not limitative of the present invention.

Example

From two slants of 2–3 days, on malt agar or potato agar-glucose-yeast, washed with 5 to 10 ml. of physiological saline solution, a suspension of the strain I.P.V. F–434 (ATCC No. 20350) was prepared, for inoculation into a trough of 750 ml. containing 100 ml. of a cultural medium comprising:

| | |
|---|---|
| Maize flour | g 15 |
| Milk serum powder | g 10 |
| $K_2HPO_4$ | g 1 |
| $ZnSO_4 \cdot 7H_2O$ | mg 5 |
| Spring water to make up to 1 liter. | |

The medium, brought to a pH of 7 and sterilized at 121° C. for one-half hour, after cooling to 40° to 45° C., was inoculated and the culture kept for 36 to 48 hours in linear agitation at 120 cpm. (8 cm. stroke) with the temperature thermostatically controlled at 43° to 45° C.

The broth culture from 3 to 5 troughs was used as an inoculum for a 10-liter fermenting vessel containing 5 liters of the same medium as described above. After approximately 30 hours at 43° to 45° C. with agitation at the rate of 500 r.p.m. and aeration of 0.5 liter/liter/minute, the broth culture obtained was in turn used as an inoculum, at the rate of 10%, for fermenting vessels of 20 liters capacity containing 12 liters of the same culture medium. The conditions of fermentation for production of the enzyme were: temperature 43° to 45° C., agitation 500 r.p.m., and aeration 4.0 to 0.6 liter/liter/minute.

As an antifoaming product, and emulsion of silicone of the commercial Dow Corning Antifoam FG–10 type was added.

After 48 hours, when the pH had reached a value of around 7.8 and a titre in proteolytic units of 10 to 12 PU/ml., fermentation was interrupted. 100 liters of the broth culture thus obtained were subjected to centrifugal treatment in order to separate the mycelium and the insoluble residue from the cultural medium. The liquid was then brought to a pH of 5.5 with N HCl and, after addition of a solution of 250 g. of tannin in 1500 ml. of water, kept under slow agitation for 40 minutes.

After the liquid had been transferred to a column, a flaky precipitate was obtained which was allowed to settle for three hours at room temperature.

From the bottom of the column, approximately 20 liters of liquid containing the acid precipitate were then prepared and subjected to centrifugal treatment at 600 r.p.m.

The precipitate separated was washed three times with a total of 5 liters of acetone and then, after trituration, subjected to drying in a vacuum at ambient temperature.

Approximately 200 g. of enzyme powder were obtained, nut-brown in color, amorphous in appearance, with an activity equal to 3500 PU per g.

BRIEF DESCRIPTION OF THE DRAWINGS

Such proteolytic activity developed preferably at pH values of from 7 to 11, as in FIG. 1, and at temperatures between 45° and 65° C., as in FIG. 2, and exhibited sufficient stability (FIGS. 3 and 4) for practical applications such as those relative to the formulation of detergent products.

Although the present invention has been adequately set forth in the foregoing specification and examples included therein, it is readily apparent that various modifications

What is claimed is:

1. A process for the manufacture of proteases of high proteolytic activity, having optimum activity at a pH ranging from 7 to 11 and at a temperature of from 45° to 65° C. and exhibiting a stability of at least 1 hour at 40° C. and at a pH of from 5 to 10, which comprises:
culturing the micro-organism designated as ATCC No. 20350 belonging to the thermophilic eumycetes group in cultural media comprising at least one source of carbon at least one source of nitrogen, and at least one mineral salt in the presence of a quantity of air ranging from 0.2 to 1 liter/liter/minute, under agitation, for a time ranging from 30 to 70 hours, at a temperature of 38° to 45° C. and at a pH value of from 6.5 to 8.

2. The process of claim 1, wherein the source of carbon is a member selected from the group consisting of starch, dextrin, maltose, lactose, and other carbon-donating carbohydrates.

3. The process of claim 1, wherein the nitrogen source is derived from a member selected from the group consisting of the carbon sources of claim 2, proteins, their soluble peptones, and inorganic sources.

4. The process of claim 1, wherein said mineral salt is a member selected from the group consisting of inorganic phosphates, magnesium sulfate, and zinc sulfate.

5. The process of claim 1, wherein the cultural broths obtained at the end of fermentation, following separation of the solid parts suspended therein, are subjected to concentration and purification.

6. The process of claim 5, wherein concentration is carried out by precipitation of the enzyme with a member selected from the group consisting of ammonium sulfate, chlorides, tannin, acetone, and ethanol.

References Cited
UNITED STATES PATENTS

| | | | |
|---|---|---|---|
| 3,694,316 | 9/1972 | Kawai et al. | 195—66 R |
| 3,652,399 | 3/1972 | Isono et al. | 195—62 |

LIONEL M. SHAPIRO, Primary Examiner

U.S. Cl. X.R.

195—66 R